US007855801B2

(12) United States Patent
Kurakata

(10) Patent No.: US 7,855,801 B2
(45) Date of Patent: Dec. 21, 2010

(54) COLOR IMAGE FORMING APPARATUS AND IMAGE OUTPUT METHOD

(75) Inventor: Tsuyoshi Kurakata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 212 days.

(21) Appl. No.: 12/180,506

(22) Filed: Jul. 25, 2008

(65) Prior Publication Data

US 2008/0285079 A1      Nov. 20, 2008

Related U.S. Application Data

(62) Division of application No. 10/635,568, filed on Aug. 7, 2003, now Pat. No. 7,471,409.

(30) Foreign Application Priority Data

Aug. 16, 2002   (JP)   ............................. 2002-237476

(51) Int. Cl.
*G06F 15/00* (2006.01)
*G06K 9/00* (2006.01)
(52) U.S. Cl. ..................................... 358/1.15; 382/167
(58) Field of Classification Search ................ 358/1.15, 358/1.13, 1.14, 1.16, 1.18, 406, 504, 523, 358/519, 539, 501, 300, 3.02, 1.1, 1.9; 359/637, 359/633; 382/274, 167, 112; 347/19, 274, 347/37, 43, 100
See application file for complete search history.

(56) References Cited

U.S. PATENT DOCUMENTS

| 6,046,820 | A  | * | 4/2000  | Konishi ..................... 358/1.9 |
| 6,185,007 | B1 |   | 2/2001  | Hayashi et al. |
| 6,441,923 | B1 | * | 8/2002  | Balasubramanian et al. ..................... 358/3.23 |
| 6,473,197 | B1 |   | 10/2002 | Shimazaki |
| 6,975,418 | B1 |   | 12/2005 | Ohta et al. |
| 2002/0118976 | A1 | * | 8/2002 | Fischer ........................ 399/49 |

FOREIGN PATENT DOCUMENTS

JP       10-117264 A      5/1998

(Continued)

OTHER PUBLICATIONS

Japanese Office Action in corresponding Japanese Patent Application No. 2002-237476 filed Aug. 23, 2008.

(Continued)

*Primary Examiner*—Saeid Ebrahimi Dehkordy
(74) *Attorney, Agent, or Firm*—Fitzpatrick, Cella, Harper & Scinto

(57) ABSTRACT

A color image forming apparatus and an image output method capable of producing a PDL output without interfering with the execution of a calibration procedure is provided. A main controller rasterizes PDL data from a network on a DRAM as image data. The main controller determines whether or not a calibration procedure is being executed. If it is determined that the calibration procedure is being executed, a production of a PDL image output is put in a queue until the calibration procedure is completed. If it is determined that the calibration procedure is not being executed, the image data on the DRAM is transferred to a printer portion at an appropriate timing so that the printer portion may produce a printed page of the image data.

14 Claims, 13 Drawing Sheets

FOREIGN PATENT DOCUMENTS

| | | |
|---|---|---|
| JP | 2000069307 A | 3/2000 |
| JP | 2000099291 A | 4/2000 |
| JP | 2000227684 A | 8/2000 |
| JP | 2000253252 A | 9/2000 |
| JP | 2001094803 A | 4/2001 |
| JP | 2002229278 A | 8/2002 |

OTHER PUBLICATIONS

Translation of Japanese Office Action dated Jul. 23, 2010.

* cited by examiner

COLOR IMAGE FORMING APPARATUS AND IMAGE OUTPUT METHOD

This application is a divisional of U.S. application Ser. No. 10/635,568, filed Aug. 7, 2003, U.S. Pat. No. 7,471,409 now allowed, the contents of which are incorporated by reference herein.

CROSS REFERENCE TO RELATED APPLICATION

This application claims priority from Japanese Patent Application No. 2002-237476 filed Aug. 16, 2002, which is incorporated hereinto by reference.

BACKGROUND OF THE INVENTION

1. Field of the Invention

The present invention relates to a color image forming apparatus and an image output method connected to a network.

2. Description of the Related Art

With the recent trend in more and more copying machines going digital, multifunctional machines equipped with a plurality of functions have been put into practical applications, including such applications as using a scanner or printer of a copying machine for transmitting and receiving data through facsimile and printing page image by reconstructing it from PDL (Page Description Language) data available from a computer or the like. Such a multifunctional machine is arranged so as to be able to operate even among a plurality of functions, such as, for example, transmitting PDL-converted image through facsimile, in addition to a single function of a copying function, a facsimile function, a PDL printing function, or the like. In addition, the multifunctional machine may also be configured so as to allow, when connected to an individual apparatus such as a computer or the like over a LAN, the computer or the like to use the functions provided by the multifunction machine.

In such multifunctional machines, a common control program for a printer portion is shared among the copying machine function and the PDL print function or facsimile function or the like. Or, a common control program for a reader is shared among the copying machine function and the facsimile function or a scanner function or the like. This approach allows the capacity required for the control programs for realizing the various functions to be reduced, thus achieving the required functions economically and in a simplified manner.

Further, by providing such a multifunctional machine with a large-capacity hard disk capable of storing image data, it is possible to store and control data representing an image scanned by the scanner, an image reconstructed through PDL, a document received by facsimile, or the like as an image file or a document file in the hard disk.

In a printing unit of a color printer in an image forming apparatus, on the other hand, it is known that variations in output characteristics and unit-to-unit variations as a result of these variations in output characteristics occur, which makes it difficult to achieve an output image of a uniform quality. It is known, for example, that printed images of different tones of color result each time a printing process is carried out even using the same original.

This is attributable to the following fact in a printing unit employing, for example, an electrophotographic method. Specifically, in such an electrophotographic process as laser exposure, formation of an electrostatic latent image on a photoconductive element, development of toner, toner image transfer to a paper medium, or fusing of the toner image onto the paper medium by heat, there occurs a change in an ambient temperature or humidity surrounding the apparatus, or a change in any of component parts of the apparatus with time, which eventually results in the amount of toner fused on the paper medium being varied. It is known that such instability in printing output characteristics is not unique only to the electrophotographic method, but the phenomenon occurs likewise in an ink jet method, a thermal transfer method, and other various methods.

Calibration processing is then carried out. In the calibration processing, an image of a predetermined test gradation pattern is produced, an image density of the pattern produced is measured, and printing characteristics of the printing unit are then corrected based on the results of the measurement of the image density.

An image forming apparatus itself is, however, used for producing a printed output of the test gradation pattern or processing measurement data of the image density of the test gradation pattern, even if an image data is transferred or a print command is issued thereto while the printing unit is being calibrated. This makes it impossible for the printing unit to execute the particular printing function. That is, a computer or the like requests a PDL print function, a facsimile function, or the like to be executed through a network, regardless of whether the calibration process is being carried out or not in the image forming apparatus. This results in a print command being rejected, or a process for generating image forming data, such as rasterization of PDL data, being initiated after the completion of calibration. As a result, printing processing is retarded.

It is therefore a first object of the present invention to provide a color image forming apparatus and an image output method capable of producing a PDL output without interfering with the execution of a calibration process, when the execution of a PDL print function is requested over a network during execution of the calibration process.

It is a second object of the present invention to provide a color image forming apparatus and an image output method capable of producing an output of a facsimile-received document without interfering with the execution of a calibration process, when the execution of a facsimile reception and print function is requested over a network during execution of the calibration process.

SUMMARY OF THE INVENTION

To achieve the foregoing objects, an image forming apparatus according to the present invention creates image forming data based on image data received from a host device and forms an image based on the image forming data. The image forming apparatus according to the present invention is provided with calibration means for executing a calibration process, through which image output characteristics of the image forming apparatus are set to predetermined ones, and control means for at least allowing the image forming data to be created, if the calibration means is in the calibration process when image data is received from the host device.

The image forming apparatus according to the present invention is connected to the host device over a network. The image forming apparatus is further provided with rasterization means for reconstructing image data from PDL data received over the network, storage means for storing image data reconstructed by the rasterization means, and image forming means for forming an image based on the image data stored in the storage means. The control means is provided with discrimination means for determining whether or not a calibration process is being executed when image data is stored in the storage means. If the discrimination means determines that a calibration process is being executed, the control means puts the image forming means in a standby state. After the execution of the calibration process is completed, the control means allows the image forming means to start forming an image. If the discrimination means determines that a calibration process is not being executed, the control means lets the image forming means to start forming the image.

Further, the image forming means is capable of forming an image through an electrophotographic method.

The image forming means is also capable of forming an image through an ink jet method.

An image forming apparatus according to another aspect of the present invention creates image forming data based on fax-received data received from a host device and forms an image based on the image forming data. The image forming apparatus according to the preferred embodiment of the present invention is provided with calibration means for executing a calibration process, through which image output characteristics of the image forming apparatus are set to predetermined ones, and control means for at least allowing the image forming data to be generated, if the calibration means is in the calibration process when fax-received data is received from the host device.

The image forming apparatus according to the present invention is connected to the host device over a network. The image forming apparatus is further provided with interpretation means for interpreting fax-received data received over the network, storage means for storing image data interpreted by the interpretation means, and image forming means for forming an image based on the image data stored in the storage means. The control means is provided with discrimination means for determining whether or not a calibration process is being executed when image data is stored in the storage means. If the discrimination means determines that a calibration process is being executed, the control means puts the image forming means in a standby state. After the execution of the calibration process is completed, the control means allows the image forming means to start forming an image. If the discrimination means determines that a calibration process is not being executed, the control means lets the image forming means to start forming the image.

Further, the image forming means is capable of forming an image through the electrophotographic method and also through the ink jet method.

An image forming method according to further aspect of the present invention creates image forming data based on image data received from a host device and forms an image based on the image forming data.

The image forming method according to the preferred embodiment of the present invention is provided with a calibration step for executing a calibration process, through which image output characteristics of the image forming apparatus are set to predetermined ones, and a control step for at least allowing the image forming data to be created, if the calibration means is in the calibration process when image data is received from the host device.

The image forming apparatus according to the present invention is connected to the host device over a network. The image forming apparatus is provided with rasterization means for reconstructing image data from PDL data received over the network, storage means for storing image data reconstructed by the rasterization means, and image forming means for forming an image based on the image data stored in the storage means. The control step is provided with a discrimination step for determining whether or not a calibration process is being executed when image data is stored in the storage means. If the discrimination step determines that a calibration process is being executed, the control step puts the image forming means in a standby state. After the execution of the calibration process is completed, the control step allows the image forming means to start forming an image. If the discrimination step determines that a calibration process is not being executed, the control step lets the image forming means to start forming the image.

An image forming method according to further aspect of the present invention generates image forming data based on fax-received data received from a host device and forms an image based on the image forming data. The image forming method according to the preferred embodiment of the present invention is provided with a calibration step for executing a calibration process, through which image output characteristics of the image forming apparatus are set to predetermined ones, and a control step for at least allowing the image forming data to be generated, if the calibration means is in the calibration process when fax-received data is received from the host device.

The image forming apparatus according to the present invention is connected to the host device over a network. The image forming apparatus is provided with interpretation means for interpreting fax-received data received over the network, storage means for storing image data interpreted by the interpretation means, and image forming means for forming an image based on the image data stored in the storage means. The control step is provided with discrimination means for determining whether or not a calibration process is being executed when image data is stored in the storage means. If the discrimination means determines that a calibration process is being executed, the control step puts the image forming means in a standby state. After the execution of the calibration process is completed, the control step allows the image forming means to start forming an image. If the discrimination means determines that a calibration process is not being executed, the control step lets the image forming means to start forming the image.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Preferred embodiments according to the present invention will be described in detail with reference to the accompanying drawings.

Figure 1:
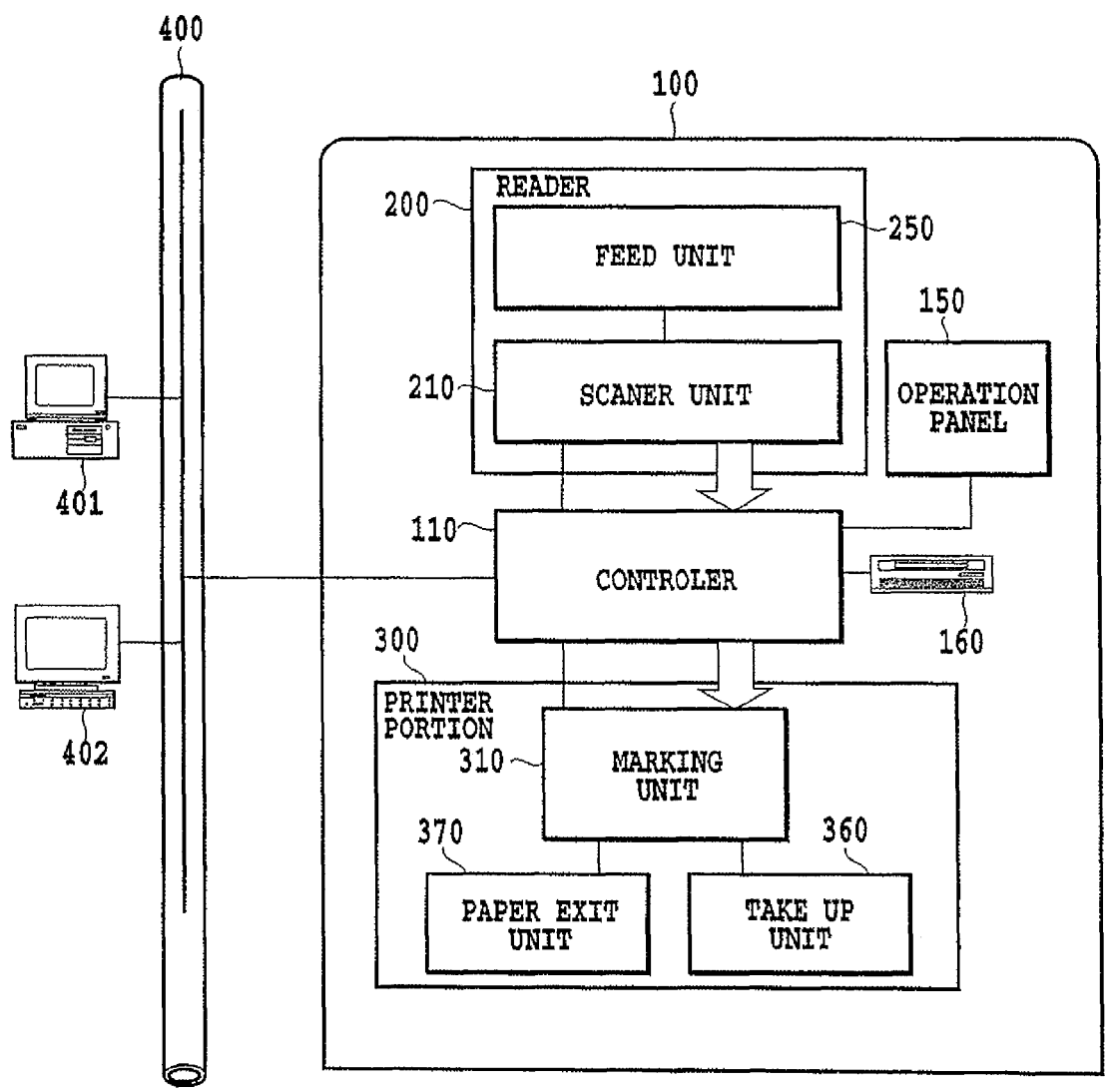
FIG. 1 is a block diagram showing one preferred embodiment of the present invention.

FIG. 1 is a block diagram showing one preferred embodiment of the present invention. The block diagram shown in FIG. 1 represents an example of an image input/output system. A reader 200 optically reads an original image and converts it to corresponding image data. The reader 200 is composed of a scanner unit 210 having a function of reading an original and an original take-up and feed unit 250 having a function of transporting pages of an original document.

A printer portion 300 transports recording paper, prints image data thereon as a visible image, and feeds the printed recording paper out of the apparatus. The printer portion 300 is composed of a paper take-up unit 360 having a plurality of types of recording paper cassettes, a marking unit 310 having a function of transferring and fusing the image data onto the recording paper, and a paper exit unit 370 having a function of sorting or stapling and feeding out of the apparatus the printed recording paper.

A controller 110 is electrically connected to the reader 200 and the printer portion 300 and further connected via a network 400 to host computers 401, 402.

The controller 110 provides a copying function by controlling the reader 200 so as to read the image data on the original and controlling the printer portion 300 so as to output the image data on the recording paper. The controller 110 also provides a scanner function that translates the image data read by the reader 200 to corresponding coded data and transmits the coded data via the network 400 to the host computer, and a printer function that converts the coded data received from the host computer via the network 400 to corresponding image data and outputs the image data to the printer portion 300.

An operation panel 150, connected to the controller 110, is provided with a liquid crystal touch panel for providing a user I/F for an operation of the image input/output system.

Figure 2:
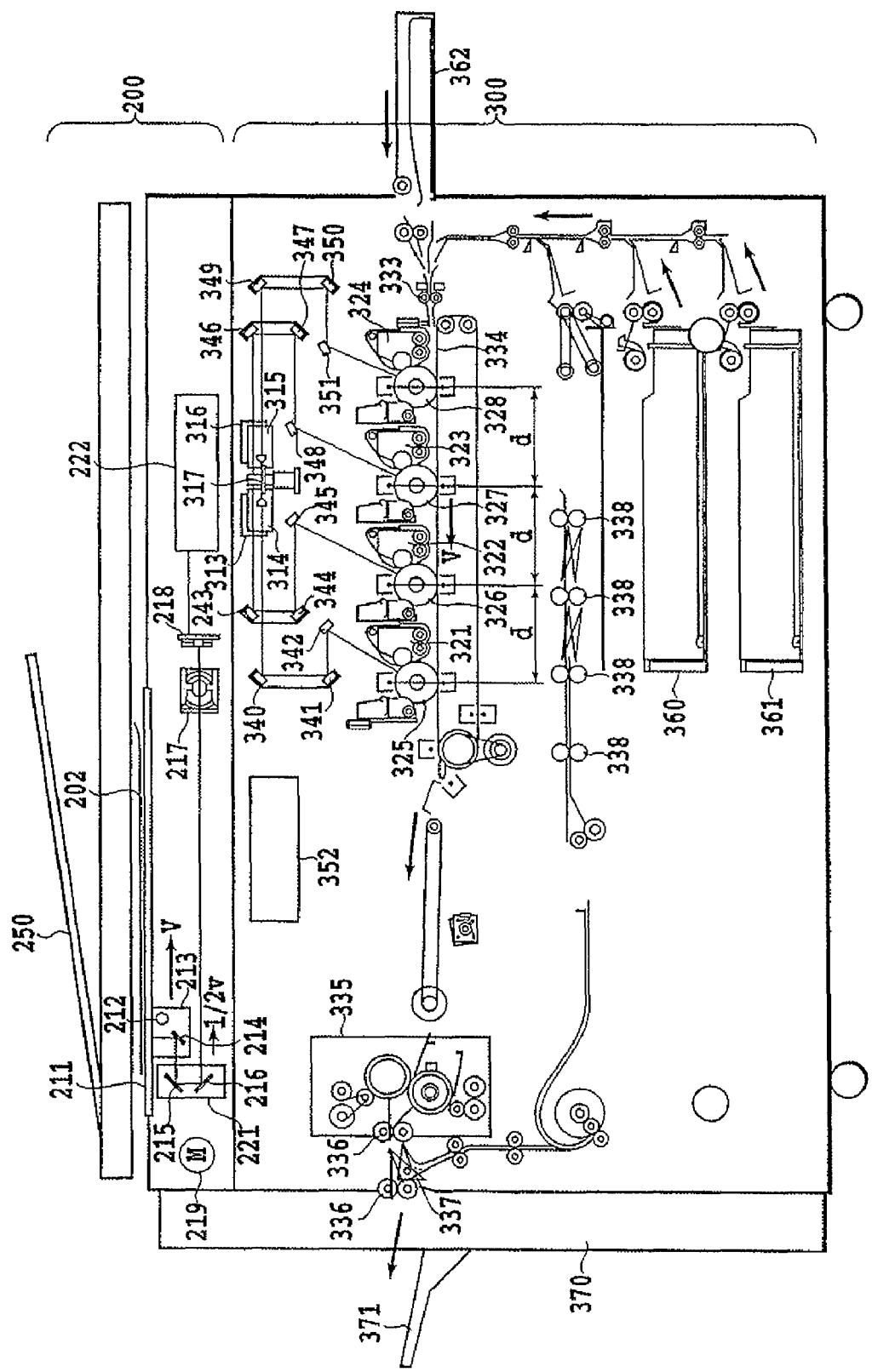
FIG. 2 is a sectional view showing the construction of a reader 200 and a printer portion 300 shown in FIG. 1.

FIG. 2 is a sectional view showing the construction of the reader 200 and the printer portion 300 shown in FIG. 1. The original take-up and feed unit 250 of the reader 200 takes up and feeds each page of the original document, one page at a time in ascending order of page, onto a platen glass 211. When a reading operation of the original page is completed, the original take-up and feed unit 250 feeds the original page on the platen glass 211 out, off the platen glass 211. When the original page is transported onto the platen glass 211, a lamp 212 is turned ON and an optics unit 213 is moved for carrying out an exposure scanning process for the original page. Light reflected off the original page is guided at this time by mirrors 214, 215, 216 and a lens 217 to strike a CCD image sensor (hereinafter referred to as the "CCD") 218. The CCD 218 reads the image of the original page as the original page is scanned in the manner described above. A reader image forming portion 222 performs predetermined processing for the image data output from the CCD 218 and outputs results thereof to the controller 110 by way of a scanner I/F 140. A printer image forming portion 352 outputs an image signal transmitted from the controller 110 by way of a printer I/F 145 to a laser driver 317.

The laser driver 317 of the printer portion 300 drives laser light generator 313 to 316 to emit a laser light beam in accordance with the image data output from the printer image forming portion 352. Photoconductive drums 325 to 328 are irradiated with the laser light beam by mirrors 340 to 351, and a latent image is formed on the photoconductive drums 325 to 328 in accordance with the laser light beam. Developing units 321 to 324 develop a latent image with toner of black (Bk), yellow (Y), cyan (C), and magenta (M), respectively. The developed images of toner of different colors are transferred to the paper for producing a full-color printed paper.

A paper cassette 360, 361, or a manual bypass tray 362 takes up and feeds a sheet of paper at a timing in synchronism with the start of irradiation of the laser light beam. The paper moves past a registration roller 333 and is then attracted onto a surface of a transfer belt 334 and transported. The toner images sticking to the photoconductive drums 325 to 328 are transferred onto the recording paper. The recording paper, on which the toner images are placed, is transported to a fuser 335 which fuses the toner images in the recording paper through heat and pressure. The recording paper, which has moved past the fuser 335, is fed out of the apparatus by an exit roller 336. An exit unit 370 tidies up sheets of recording paper fed out to sort or staple together into sets or stacks of printed paper.

If a setting is made for two-sided recording, the recording paper transported up to the exit roller 336 is fed backward by changing the direction of rotation of the exit roller 336 backward. A flapper 337 then guides the recording paper toward a duplex transport path 338. The recording paper guided to the duplex transport path 338 is next taken up and fed to the transfer belt 334 at the timing as described in the foregoing.

<Description of the Reader Image Forming Portion 222>

Figure 3:
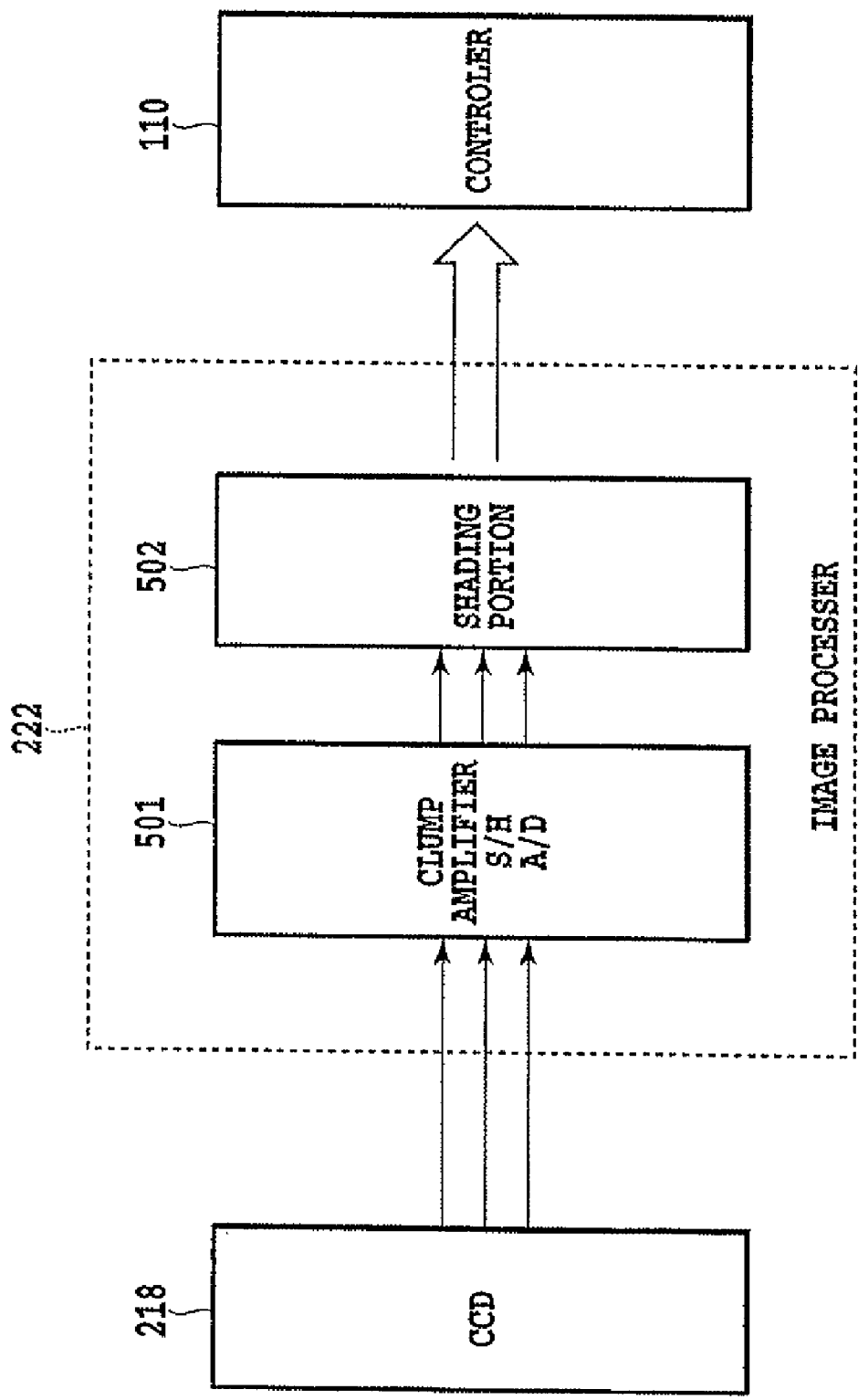
FIG. 3 is a block diagram showing the construction of a reader image forming portion 222 shown in FIG. 2.

FIG. 3 is a block diagram showing the construction of the reader image forming portion 222 shown in FIG. 2. In the reader image forming portion 222, the original placed on the platen glass 211 is read and resultant data thereof is converted to a corresponding electrical signal by the CCD 218. In the case of a color sensor, the CCD 218 may be a type, in which an R color filter, a G color filter, and a B color filter are mounted in-line in order of R, G, and B on a I-line CCD. Or, the CCD 218 may still be a type that is a 3-line CCD, each line being mounted with an R filter, a G filter, and a B filter, respectively. The filter may also be an on-chip type, or separated from the CCD. The electrical signal (an analog image signal) is then applied to the image forming portion 222 and sampled and held (S/H) by a clamp, amplifier, S/H, and A/D 501. With a dark level of the analog image signal clamped to a reference voltage, the analog image signal is then amplified to a required level (order of processing is not limited to that described) and goes through A/D conversion. The analog image signal is converted to, for example, a digital signal with each of R, G, and B being 8 bits. The RGB signal then undergoes a shading correction and a black correction at a shading portion 502 before being output to the controller 110.

<Description of the Controller 110>

Figure 4:
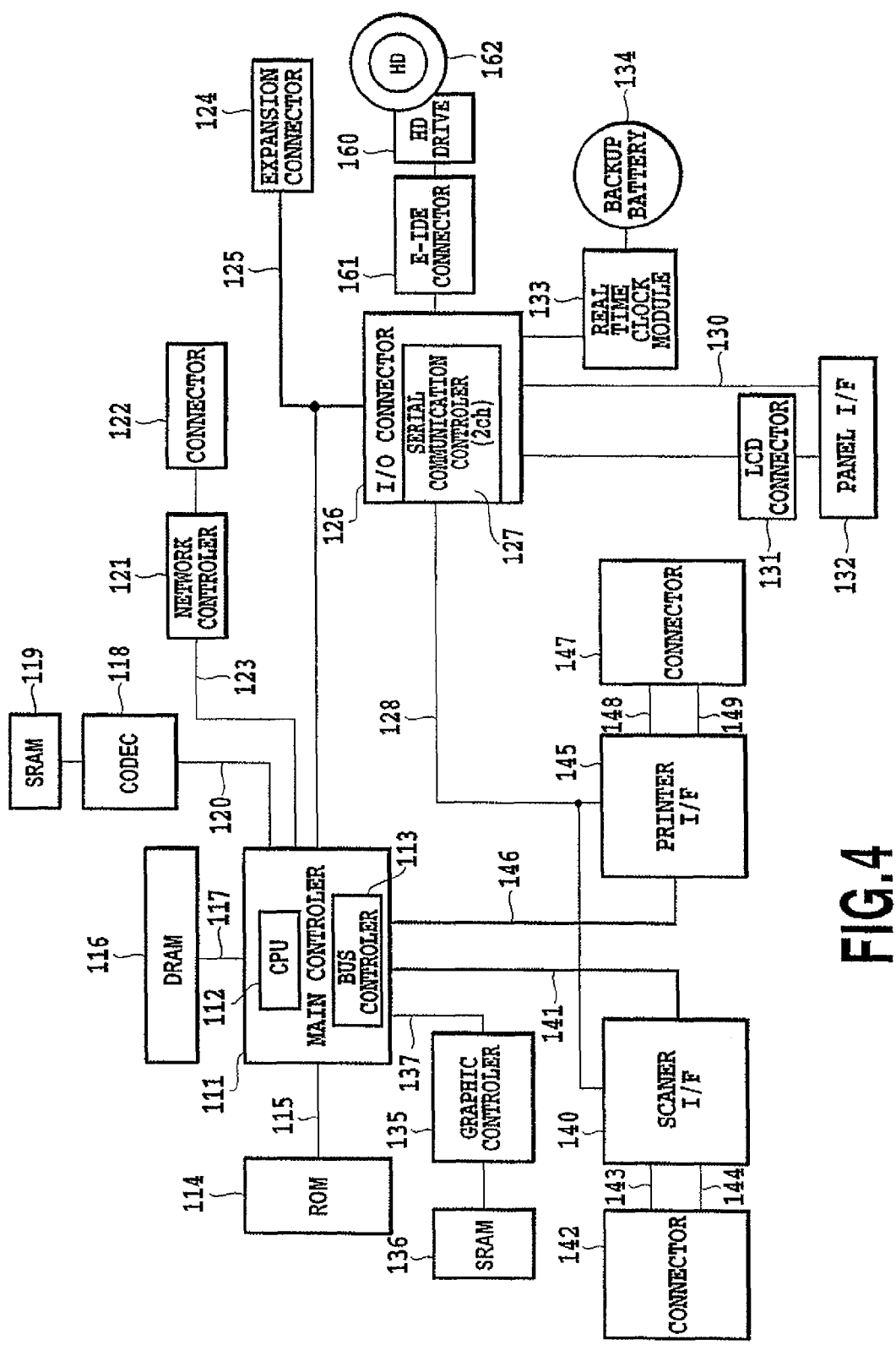
FIG. 4 is a block diagram showing the construction of a controller 110 shown in FIG. 1.

FIG. 4 is a block diagram showing the construction of the controller 110 shown in FIG. 1. A main controller 111 is composed mainly of a CPU 112, a bus controller 113, and various types of I/F controller circuits.

The CPU 112 and the bus controller 113 control the operation of an entire controller 110. The CPU 112 runs based on a program read by way of a ROM I/F 115 from a ROM 114. Operations of interpreting PDL (Page Description Language) coded data received from the host computer and converting the coded data to equivalent raster image data are also described in this program and processed through software functions. The bus controller 113 controls data transfer carried out across different I/Fs, controlling reconciliation of bus contention and DMA data transfer.

A DRAM 116 is connected to the main controller 111 through a DRAM I/F 117, used as a work area for the CPU 112 to operate and an area for storing image data.

A CODEC 118 compresses raster image data stored on the DRAM 116 through a format of MH, MR, MMR, JBIG, JPEG, or the like and uncompresses compressed and stored coded data to raster image data. An SRAM 119 is used as a temporary work area for the CODEC 118. The CODEC 118 is connected to the main controller 111 by way of an I/F 120 and data transfer with the DRAM 116 is carried out through DMA as controlled by the bus controller 113.

A graphic processor 135 performs processing of image rotation, image zooming, color space conversion, and binarization for the raster image data stored on the DRAM 116. An SRAM 136 is used as a temporary work area for the graphic processor 135. The graphic processor 135 is connected to the main controller 111 by way of an I/F 137 and data transfer with the DRAM 116 is carried out through DMA as controlled by the bus controller 113.

A network controller 121 is connected to the main controller 111 through an I/F 123, and to an external network through a connector 122. A common network is Ethernet (a registered trademark). An expansion connector 124 for connecting an expansion board and an I/O controller 126 are connected to a general-purpose high-speed bus 125. A host computer I bus is commonly available as the general-purpose high-speed bus. The I/O controller 126 is provided with an asynchronous serial communications controller 127 in two channels for transmitting a control command to, and receiving it from, each CPU of the reader 200 and the printer portion 300. The asynchronous serial communications controller 127 is connected to a scanner I/F 140 and a printer I/F 145 through an I/O bus 128.

A panel I/F 132, connected to an LCD controller 131, is composed of an I/F for displaying data on a liquid crystal screen on the operation panel 150 and a key input I/F 130 for inputting a hard key or a touch panel key. The operation panel 150 is provided with the liquid crystal display, a touch panel input device affixed to the liquid crystal display, and a plurality of hard keys. A signal input through the touch panel or a hard key is transmitted to the CPU 112 by way of the panel I/F 132, while the liquid crystal display displays image data transmitted from the panel I/F 132. Functions as they relate to operations of this printing apparatus, image data, and the like are displayed on the liquid crystal display. A real-time clock module 133 is for updating and storing a date and a time-of-day controlled within the apparatus, backed up by a backup battery 134.

An E-IDE interface 161 is for connecting an external storage device. In the apparatus according to the embodiment of the present invention, a hard disk drive 160 is connected through this interface for storing image data in a hard disk 162 and loading image data from the hard disk 162. Connectors 142, 147 are connected, respectively, to the reader 200 and the printer portion 300. The connectors 142, 147 are composed of asynchronous serial I/Fs 143, 148 and video I/Fs 144, 149.

The scanner I/F 140 is connected to the reader 200 through the connector 142, and connected to the main controller 111 through a scanner bus 141. The scanner I/F 140 is provided with a function for performing predefined processing for an image received from the reader 200. The scanner I/F 140 is also provided with a function for outputting a control signal generated based on a video control signal transmitted from the reader 200 to the scanner bus 141. The bus controller 113 controls data transfer from the scanner bus 141 to the DRAM 116.

The printer I/F 145 is connected to the printer portion 300 through the connector 147, and connected to the main controller 111 through the printer bus 146. The printer I/F 145 is therefore provided with a function for performing predefined processing for image data output from the main controller 111 and outputting resultant data thereof to the printer portion 300. In addition, the printer I/F 145 is also provided with a function for outputting a control signal generated based on a video control signal transmitted from the printer portion 300 to the printer bus 146. The bus controller 113 controls transfer of raster image data converted on the DRAM 116 to the printer portion 300. The raster image data is transferred through DMA to the printer portion 300 by way of the printer bus 146 and the video I/F 149.

<Description of the Image Forming Portion of the Scanner I/F 40>

Figure 5:
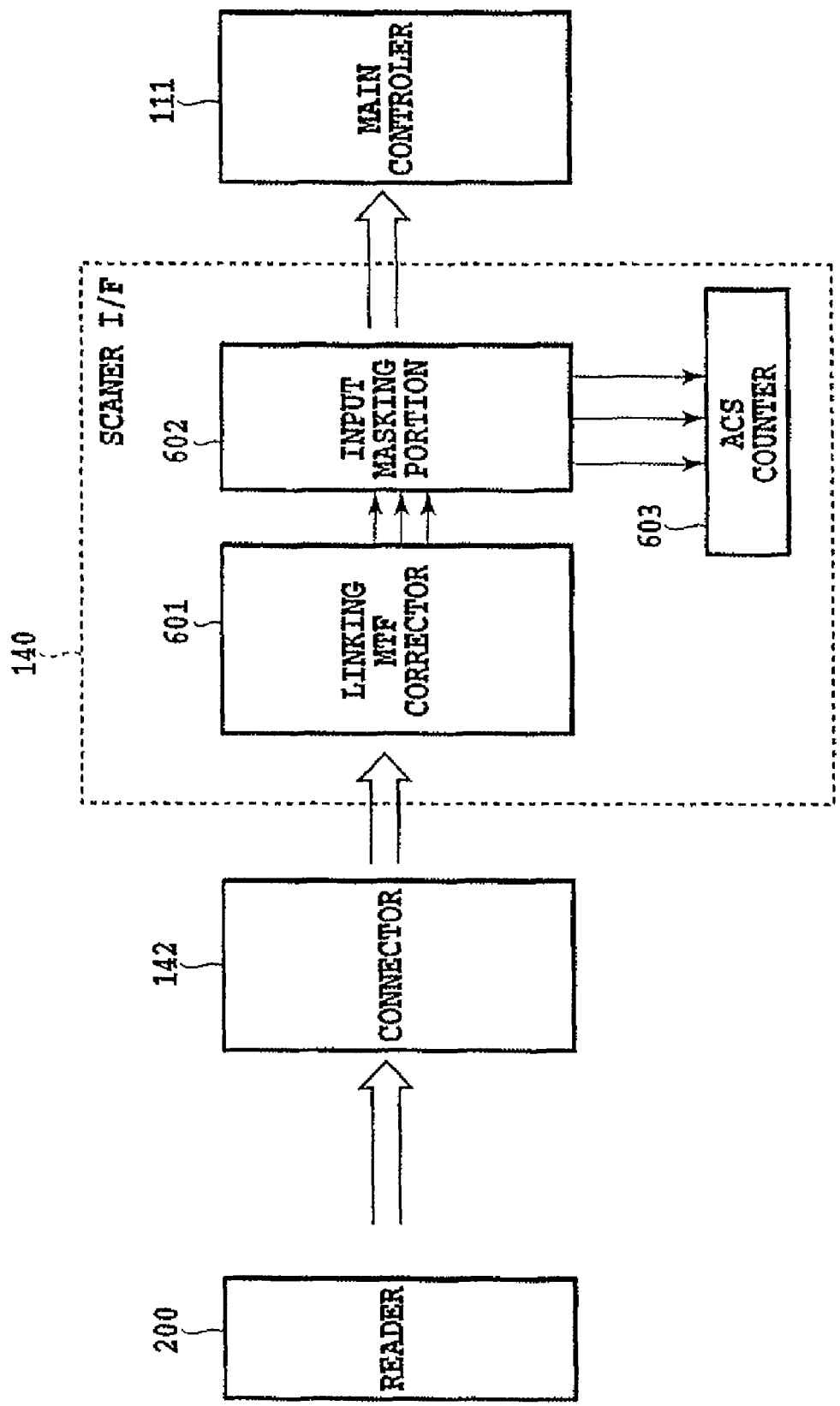
FIG. 5 is a block diagram showing the construction of a portion responsible for forming an image in a scanner I/F 140 shown in FIG. 4.

FIG. 5 is a block diagram showing the construction of a portion responsible for forming an image in the scanner I/F 140 shown in FIG. 4. If the CCD 218 is a 3-line CCD, linking processing is performed as follows because of different scanning positions involved among different lines. Specifically, a linking/MTF corrector 601 adjusts the amount of delay for each line in accordance with a scanning speed for the image signal transmitted via the connector 142. That is, the linking/MTF corrector 601 corrects a signal timing to ensure that the scanning position is the same for all three lines. In addition, since a scanning MTF varies depending on the scanning speed, these variations are further corrected by means of an MTF correction. An input masking portion 602 corrects a digital signal, the scanning position timing of which has been corrected, in accordance with spectral characteristics of the CCD 218 and spectral characteristics of the lamp 212 and the mirrors 214 to 216. An output from the input masking portion 602 is sent to an ACS counter 603 and the main controller 111.

<Description of the Image Forming Portion of the Printer I/F 145>

Figure 6:
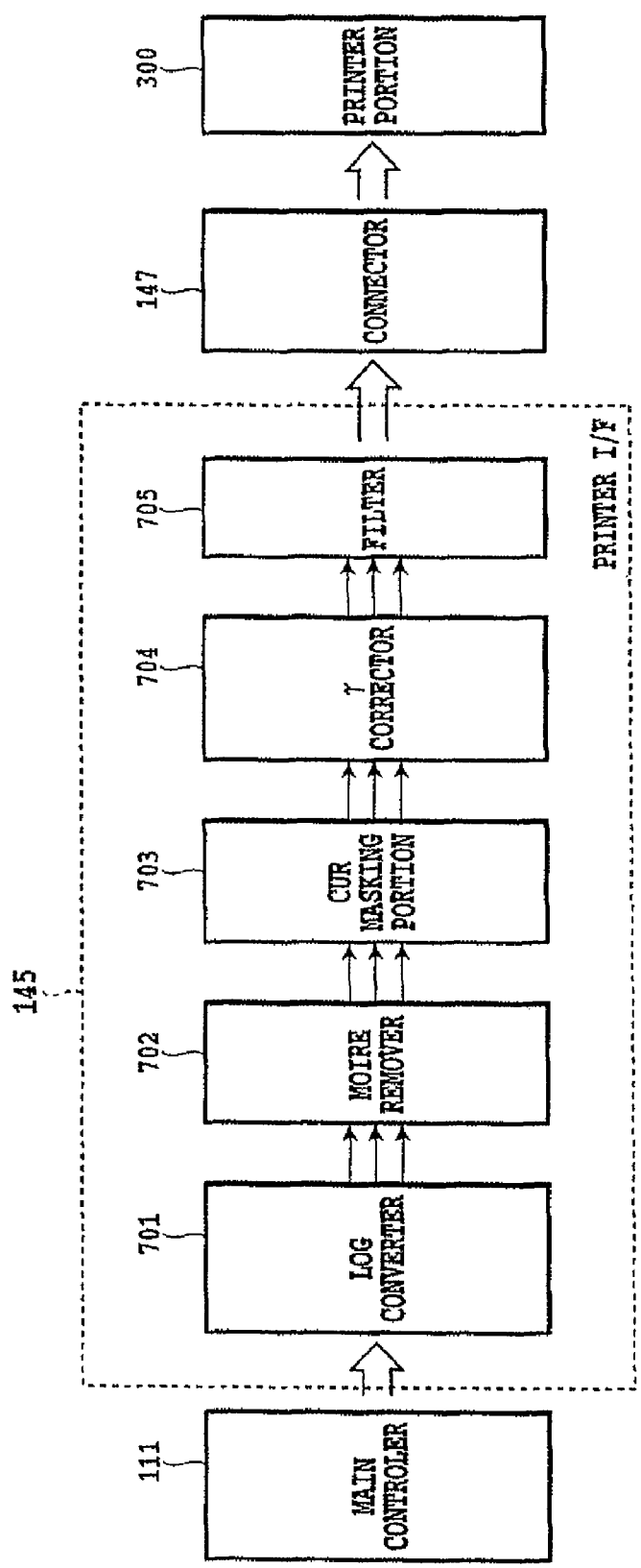
FIG. 6 is a block diagram showing the construction of a portion responsible for forming an image in a printer I/F 145 shown in FIG. 4.

FIG. 6 is a block diagram showing the construction of a portion responsible for forming an image in the printer I/F 145 shown in FIG. 4. An image signal transmitted from the main controller 111 via the printer bus 146 is first applied to a LOG converter 701. The LOG converter 701 translates an RGB signal to a corresponding CMY signal through LOG conversion. Next, a moiré remover 702 removes moiré. A UCR/masking portion 703 subjects the CMY signal, which has been processed for moiré removal, to UCR processing to generate a CMYK signal. The masking portion of the UCR/masking portion 703 then corrects the CMYK signal to a type suitable for printer output. The signal processed by the UCR/masking portion 703 is applied to a γ corrector 704. The γ corrector 704 is provided with a correction table for making density adjustments for each of C, M, Y, and K. The γ corrector 704 uses this correction table to make the necessary density adjustments. A filter 705 then performs smoothing and edge processing. Image data goes through these types of processing before being sent to the printer portion 300 via the connector 147.

<Description of the Graphic Processor 135>

Figure 7:
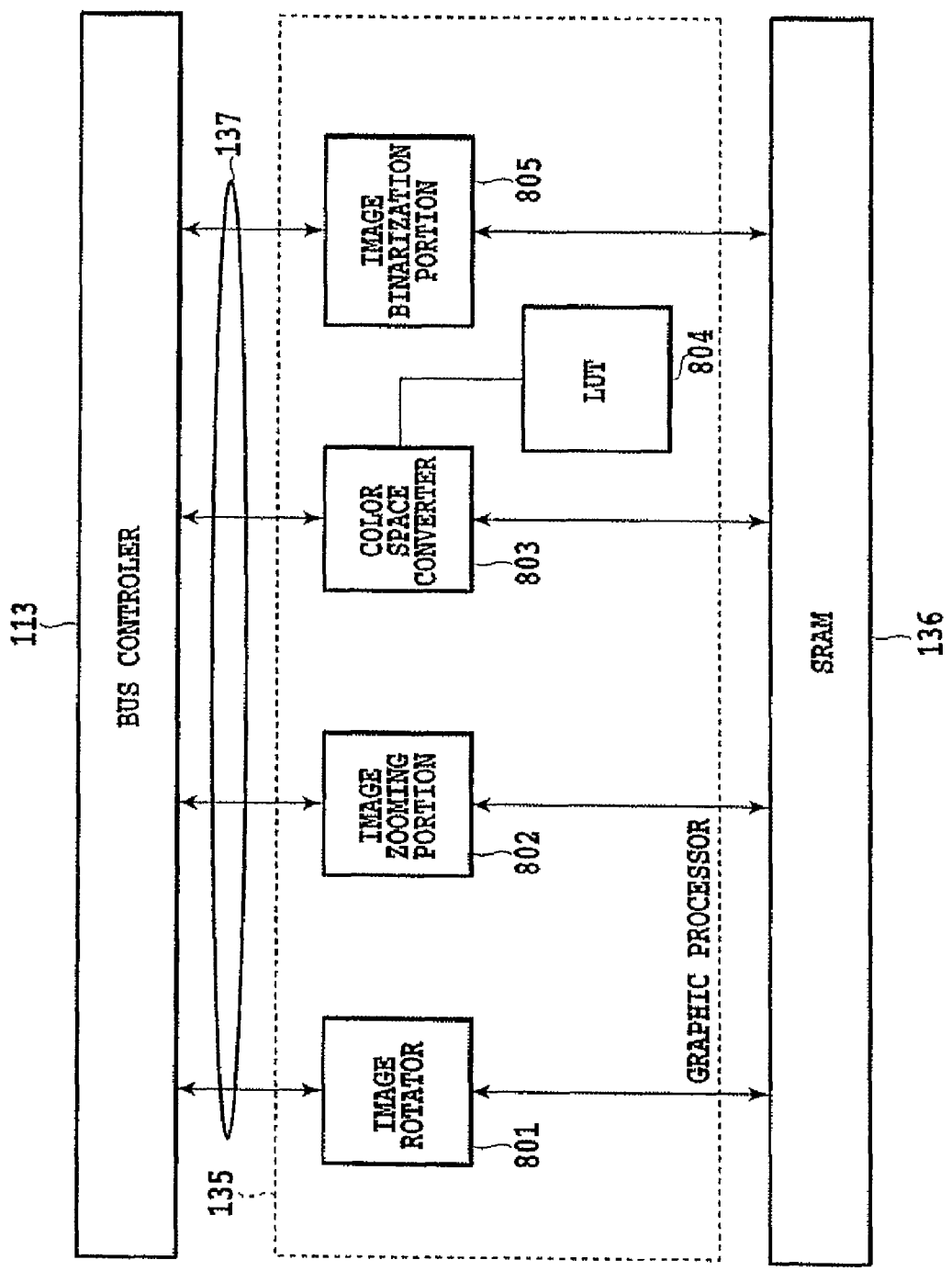
FIG. 7 is a block diagram showing the construction of a graphic processor 135 shown in FIG. 4.

FIG. 7 is a block diagram showing the construction of the graphic processor 135 shown in FIG. 4. The graphic processor 135 is provided with modules for performing, respectively, image rotation, image zooming, color space conversion, and binarization. The SRAM 136 is used as a temporary work area for each of the modules provided for the graphic processor 135. The specific work area of the SRAM 136 is statically assigned for each module in advance to prevent contention among different modules for a single work area. The graphic processor 135 is connected to the main controller 111 through the I/F 137 and data transfer with the DRAM 116 is carried out through DMA as controlled by the bus controller 113.

The bus controller 113 controls setting of a mode or the like for each of the modules provided for the graphic processor 135 and timing for transfer of image data to each module.

<Description of an Image Rotator 801>

Processing operations performed by an image rotator 801 will be explained. The CPU 112 makes settings for image rotation control in the bus controller 113 through the I/F 137. The bus controller 113, on the other hand, uses these settings made by the CPU 112 through the I/F 137 to make settings required for image rotation in the image rotator 801. These settings may include specifically, for example, an image size, a direction of rotation, an angle of rotation, and the like. When these necessary settings have been made, the CPU 112 once again gives the bus controller 113 a permit to transfer image data. In accordance with this permit, the bus controller 113 begins a transfer of image data from the DRAM 116 or a device connected through the corresponding I/F. For the purpose of this specification, the image size subject to image rotation is 32 pixels×32 lines, and an image transfer is carried out in units of 24 bytes (8 bits each of R, G, and B for one pixel) when transferring image data over an image bus.

Figure 8:
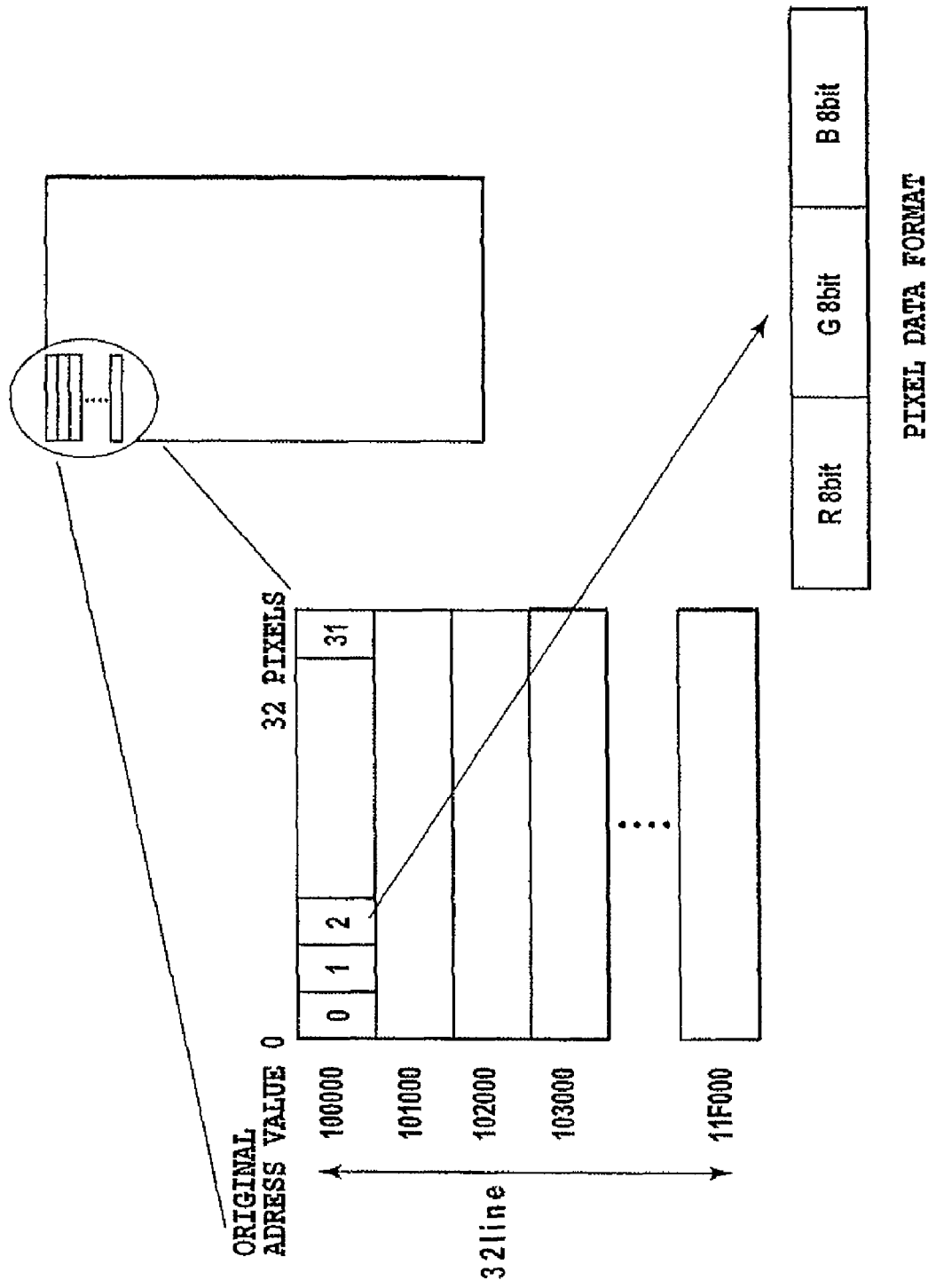
FIG. 8 is an explanatory diagram explaining an operation of an image zooming portion 802 shown in FIG. 7.

As described in the foregoing, to acquire an image of 32 pixels×32 lines, it is necessary to carry out the data transfer in the aforementioned units 32×32 times, and to transfer image data from a discontinuous address (see FIG. 8).

Figure 9:
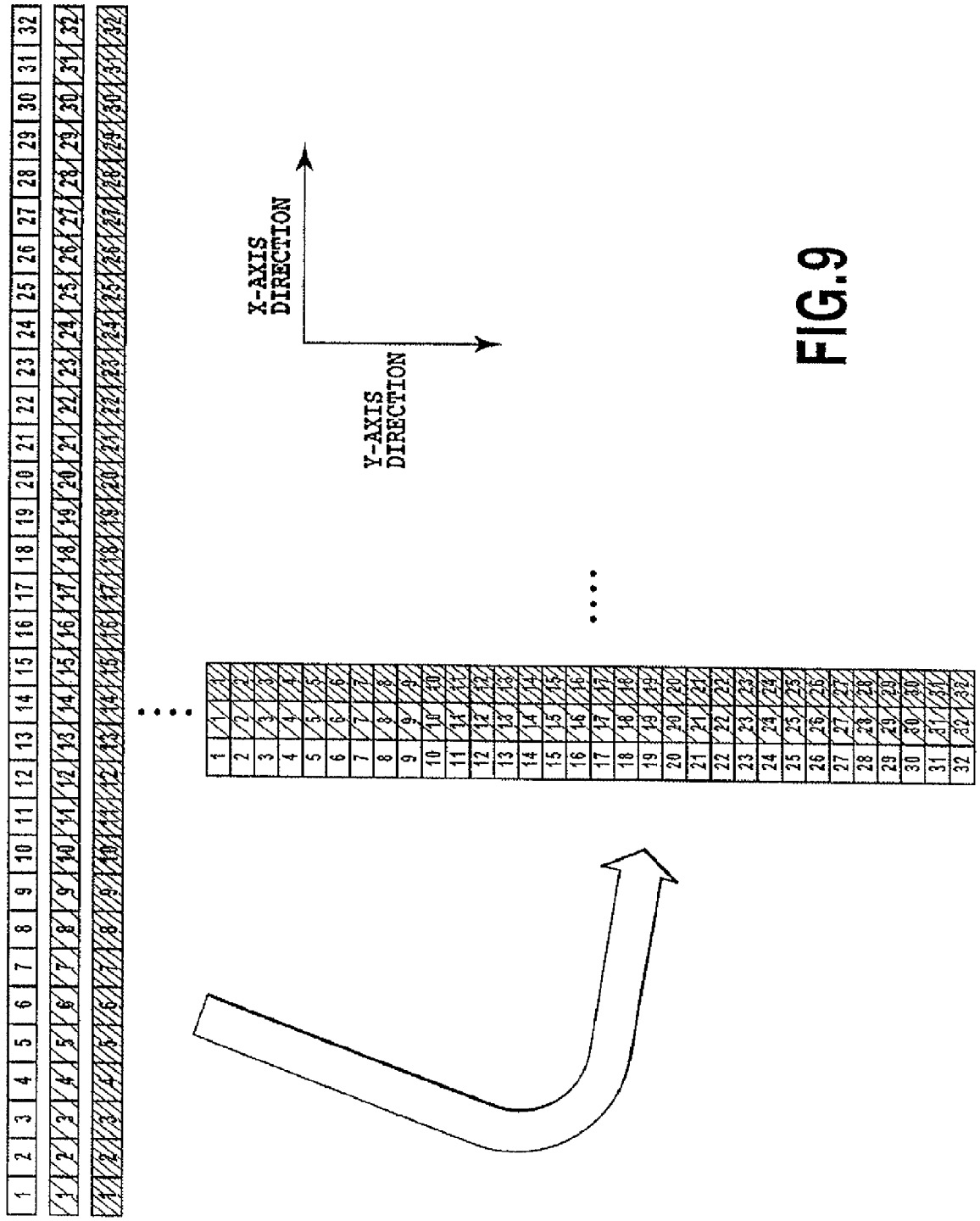
FIG. 9 is an explanatory diagram explaining an operation of an image zooming portion 802 shown in FIG. 7.

To ensure that an image rotated through a desired angle can be obtained upon reading, the image data transferred through discontinuous addressing is temporarily written in the SRAM 136. If the image is to be rotated through, for example, 90 degrees counterclockwise, the image data to be transferred is written in a Y-axis direction as shown in FIG. 9. When reading, the image data is read in an X-axis direction, which results in the original image to be rotated.

After image rotation for 32 pixels×32 lines (writing of data in the SRAM 136) has been completed, the image rotator 801 read the image data from the SRAM 136 through the reading method mentioned in the foregoing and transfers the image to the bus controller 113.

After having received the image data that has undergone rotation processing, the bus controller 113 transfers data to the DRAM 116 or the corresponding device on the I/F through continuous addressing.

A series of these processing operations is repeated until a processing request is no longer received from the CPU 112 (or, until processing for the required number of pages is completed).

<Description of an Image Zooming Portion 802>

Processing operations performed by an image zooming portion 802 will be explained. The CPU 112 makes settings for image zooming control in the bus controller 113 through the I/F 137. The bus controller 113 uses these settings made by the CPU 112 through the I/F 137 to make settings required for image zooming (a zoom ratio in a main scanning direction, a zoom ratio in a sub-scanning direction, an image size after zooming, and the like) in the image zooming portion 802. When these necessary settings have been made, the CPU 112 once again gives the bus controller 113 a permit to transfer image data. In accordance with this permit, the bus controller 113 begins a transfer of image data from the DRAM 116 or a device connected through the corresponding I/F.

The image zooming portion 802 temporarily stores the image data received from the bus controller 113 in the SRAM 136. Using the SRAM 136 as an input buffer, the image zooming portion 802 performs interpolation processing for the data stored for the required number of pixels and/or the required number of lines in accordance with the zoom ratio in the main scanning direction and/or in the sub-scanning direction, thereby enlarging or reducing the image as necessary. The data, after having been subjected to the zooming, is rewritten in the SRAM 136 and the SRAM 136 is then used as an output buffer. Next, the image zooming portion 802 reads the image data from the SRAM 136 and transfers it to the bus controller 113.

Having received the image data that has been subjected to zooming, the bus controller 113 transfers the data to the DRAM 116 or the corresponding device on the I/F.

<Description of a Color Space Converter 803>

Processing operations performed by a color space converter 803 will be explained. The CPU 112 makes settings for color space conversion control in the bus controller 113 through the I/F 137. The bus controller 113 uses these settings made by the CPU 112 through the I/F 137 to make settings required for color space conversion control (a coefficient for matrix calculation, table values of an LUT (look-up table) 804, and the like to be described later) in a color space converter 803 and the LUT 804. When these necessary settings have been made, the CPU 112 once again gives the bus controller 113 a permit to transfer image data. In accordance with this permit, the bus controller 113 begins a transfer of image data from the DRAM 116 or a device connected through the corresponding I/F.

The color space converter 803 performs a 3-by-3 matrix calculation represented by the following equation for each pixel of the image data received.

$$\begin{pmatrix} X \\ Y \\ Z \end{pmatrix} = \begin{pmatrix} a11 & a12 & a13 \\ a21 & a22 & a23 \\ a31 & a32 & a33 \end{pmatrix} \begin{pmatrix} R+b1 \\ G+b2 \\ B+b3 \end{pmatrix} + \begin{pmatrix} c1 \\ c2 \\ c3 \end{pmatrix}$$

In the above equation, R, G, and B are inputs; X, Y, and Z are outputs; and a11, a12, a13, a21, a22, a23, a31, a32, a33, b1, b2, b3, c1, c2, and c3 are coefficients.

Color space conversion of various types can be performed through calculations performed using the aforementioned equation, including, for example, a conversion from an RGB color space to a Yuv color space.

A conversion by means of the LUT 804 is next performed for the data after the matrix calculation. This permits even a nonlinear conversion. It goes without saying that it is possible not to perform the LUT conversion substantially by setting a table outputting values of data as are without involving any conversion of the data.

The color space converter 803 thereafter transfers image data that has undergone the color space conversion processing to the bus controller 113.

Having received the image data that has been subjected to the color space conversion processing, the bus controller 113 transfers the data to the DRAM 116 or the corresponding device on the I/F.

<Description of an Image Binarization Portion 805>

Processing operations performed by an image binarization portion 805 will be explained. The CPU 112 makes settings for binarization control in the bus controller 113 through the I/F 137. The bus controller 113 uses these settings made by the CPU 112 through the I/F 137 to make settings required for binarization processing (various types of parameters in accordance with an applicable conversion method, and the like) in the image binarization portion 805. When these necessary settings have been made, the CPU 112 once again gives the bus controller 113 a permit to transfer image data. In accordance with this permit, the bus controller 113 begins a transfer of image data from the DRAM 116 or a device connected through the corresponding I/F.

The image binarization portion 805 performs the binarization processing for the image data received. As a method for binarization, the image data is binarized through a simple comparison made with a predetermined threshold value. It goes without saying that the image data can be binarized by a dither method, an error diffusion method, an improved error diffusion method, or the like.

The image binarization portion 805 thereafter transfers image data that has undergone the binarization processing to the bus controller 113.

Having received the image data that has been subjected to the binarization processing, the bus controller 113 transfers the data to the DRAM 116 or the corresponding device on the I/F.

<Sequence for Outputting a Copy Image>

Figure 10:
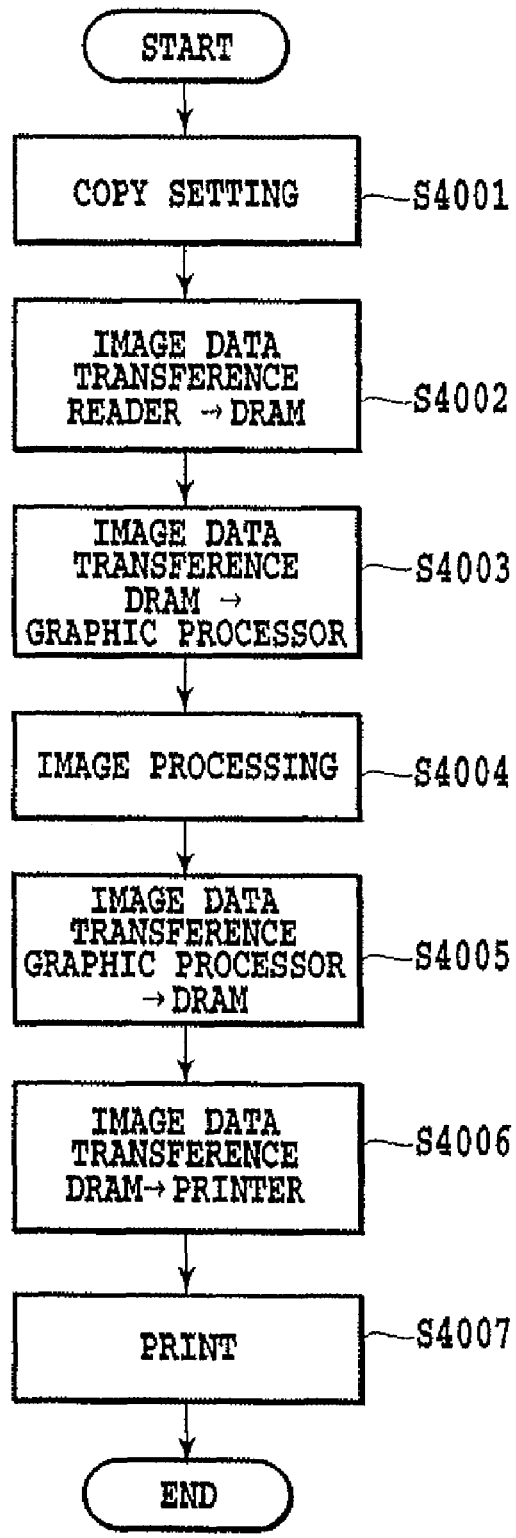
FIG. 10 is a flowchart showing a typical copy image output procedure.

FIG. 10 is a flowchart showing a typical copy image output procedure. In step S4001, a user makes copy settings for a corresponding copy image output job on the operation panel 150. The copy settings include the number of copy sets or stacks to be produced, a paper size, one-sided/two-sided, an enlargement/reduction ratio, sort output, stapling, and the like.

In step S4002, when a copy start command is issued on the operation panel 150, the main controller 111 of the controller 110 controls the reader 200 through the scanner I/F 140 and the connector 142 to scan the image data on the original. First of all, the original take-up and feed unit 250 takes up and feeds each page of the original document, one page at a time, placed therein onto the platen glass 211 and, at the same time, detects the size of the original page. Based on the size of the original page, the original page is exposed to light and scanned so that the image data thereon can be read. The image data read is stored on the DRAM 116. In the conventional copying machine, zooming processing in the sub-scanning direction is accomplished by varying a traveling speed of the optics unit 213 in accordance with the setting made of the enlargement/reduction ratio among other copy settings noted in the foregoing, that is a zoom ratio in the sub-scanning direction. In the preferred embodiment according to the present invention, however, the image data is invariably scanned at a full size (100%), regardless of the setting made of the enlargement/reduction ratio among other copy settings noted in the foregoing, and the zooming processing is done by the graphic processor 135 to be described later both for the main scanning direction and the sub-scanning direction.

In step S4003, the graphic processor 135 performs an image forming process based on the copy setting parameters described in the foregoing. For example, if an enlargement of 400% is set, the module specifically responsible for image zooming provided in the graphic processor 135 is used to perform the zooming processing both for the main scanning direction and the sub-scanning direction. When the image forming process for the image data is completed, the operation proceeds to step S4005.

In step S4005, the graphic processor 135 transfers the image data after the image forming process to the main controller 111. The main controller 111 stores the image data transferred from the graphic processor 135 on the DRAM 116.

In step S4006, the main controller 111 transfers the image data stored on the DRAM 116 to the printer portion 300 at an appropriate timing, while controlling the printer portion 300 through the printer I/F 145 and the connector 147.

In step S4007, the controller 110 controls the printer portion 300 to produce a printed page of the image data. When the transfer of the image data is completed, namely when the corresponding copy job is completed, a production of a printed page is completed.

<Sequence for Calibration>

Figure 11:
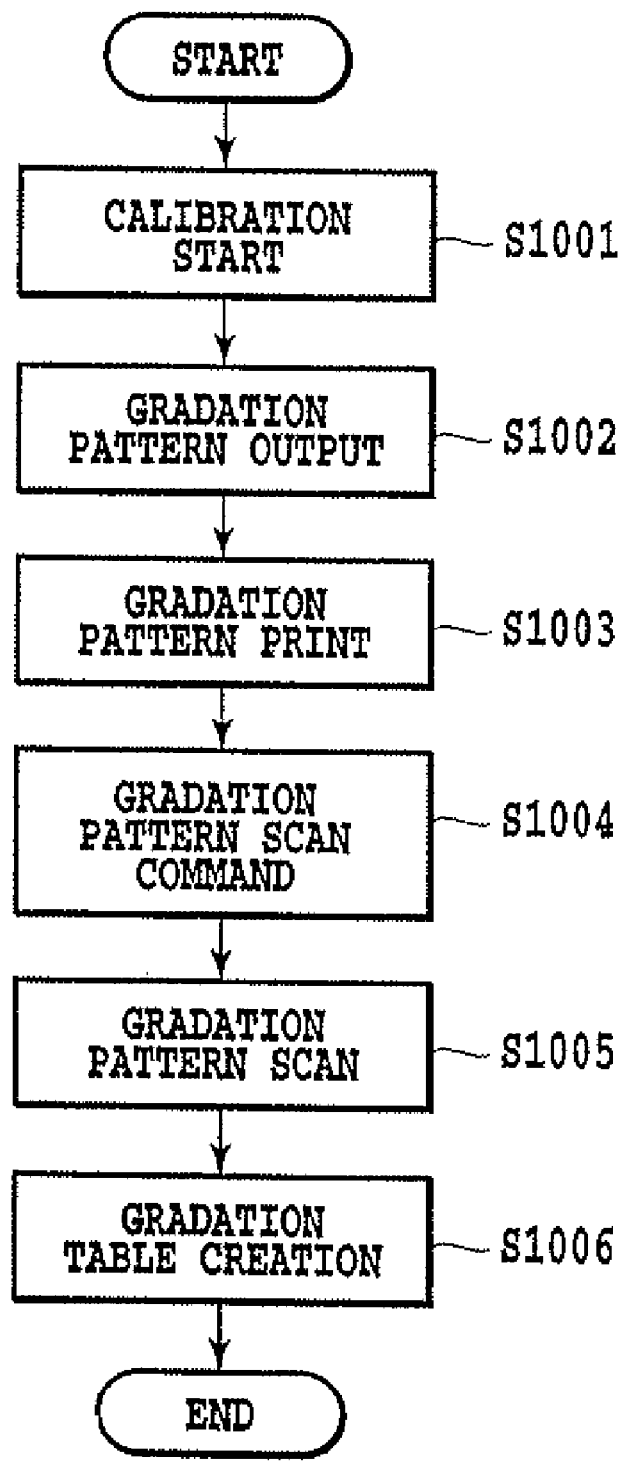
FIG. 11 is a flowchart showing a typical calibration procedure.

FIG. 11 is a flowchart showing a typical calibration procedure. In step S1001, a calibration command is issued on the operation panel 150. The start of the calibration procedure may be commanded by the user as embodied in the preferred embodiment of the present invention. It is still possible to configure so as to automatically start the calibration procedure when a predetermined condition is met.

Figure 12:
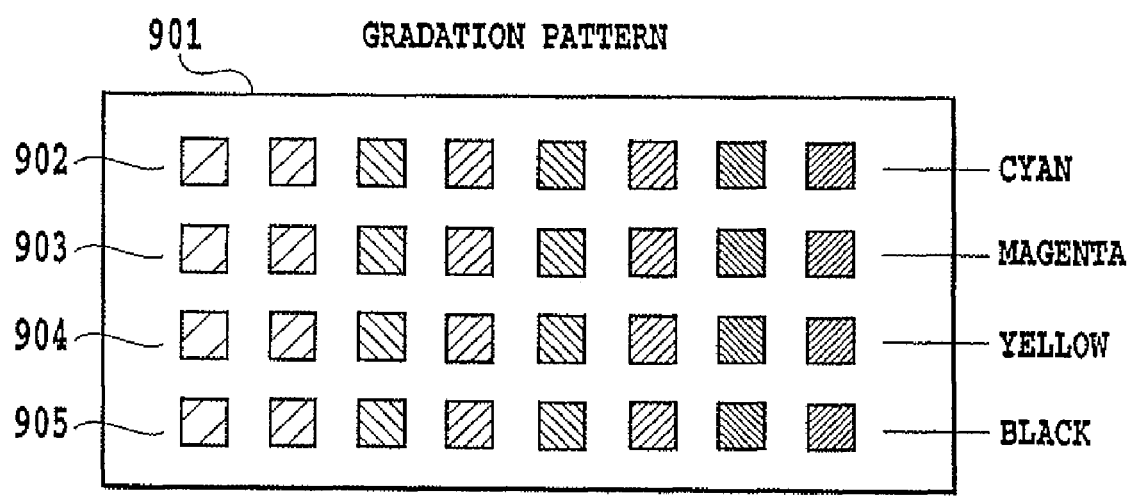
FIG. 12 is a diagram showing a typical gradation pattern.

In step S1002, when a gradation pattern output command is issued on the operation panel 150, the main controller 111 generates a gradation pattern of a bit-map format 901 for the calibration procedure and stores the gradation pattern on the DRAM 116. The gradation pattern 901 generated herein is a pattern of showing changes in a toner sticking area ratio in eight steps from 0% to 100% for cyan (C), magenta (M), yellow (Y), and black (K) corresponding to the four colors of toner used in the printer portion 300, as shown in FIG. 12. That is, patches representing a specific area ratio varying in eight different steps are generated as each of rows 902, 903, 904, and 905 for C, M, Y, and K, respectively.

In step S1003, the main controller 111 transfers the image data of the gradation pattern 901 stored on the DRAM 116 to the printer portion 300 at an appropriate timing, while controlling the printer portion 300 through the printer I/F 145 and the connector 147, thereby producing a printed page of the gradation pattern 901 on a paper medium.

In step S1004, a gradation pattern scan command is issued on the operation panel 150.

In step S1005, the main controller 111 of the controller 110 controls the reader 200 through the scanner I/F 140 and the connector 142 to scan the image data on the original.

In step 1006, luminance data of R, G, and B obtained through the scanning operation is converted to corresponding density values of C, M, Y, and K. These density values are compared with previously stored reference values for creating a correction table for each of C, M, Y, and K. The correction tables created through these steps are stored in the γ corrector 704, which completes the calibration procedure.

It is determined that a calibration procedure is being executed when the apparatus is executing any of the steps described in the foregoing. It is nonetheless possible to determine that a calibration procedure is being executed when any specific step or a combination thereof is executed; that is, it is not necessary that all of the steps described in the foregoing be executed to make a decision that a calibration procedure is underway.

According to the preferred embodiment of the present invention, the gradation pattern is explained using patches of eight different steps for each color of toner. The number of steps is not, however, limited to eight, but any will suffice. If the gradation pattern does not fit to a single sheet of paper, it may cover a plurality of sheets of paper and, for each of these sheets of paper, the steps from step S1002 through step S1005 may be repeated.

<Sequence for Producing a PDL Image Output>

Figure 13:
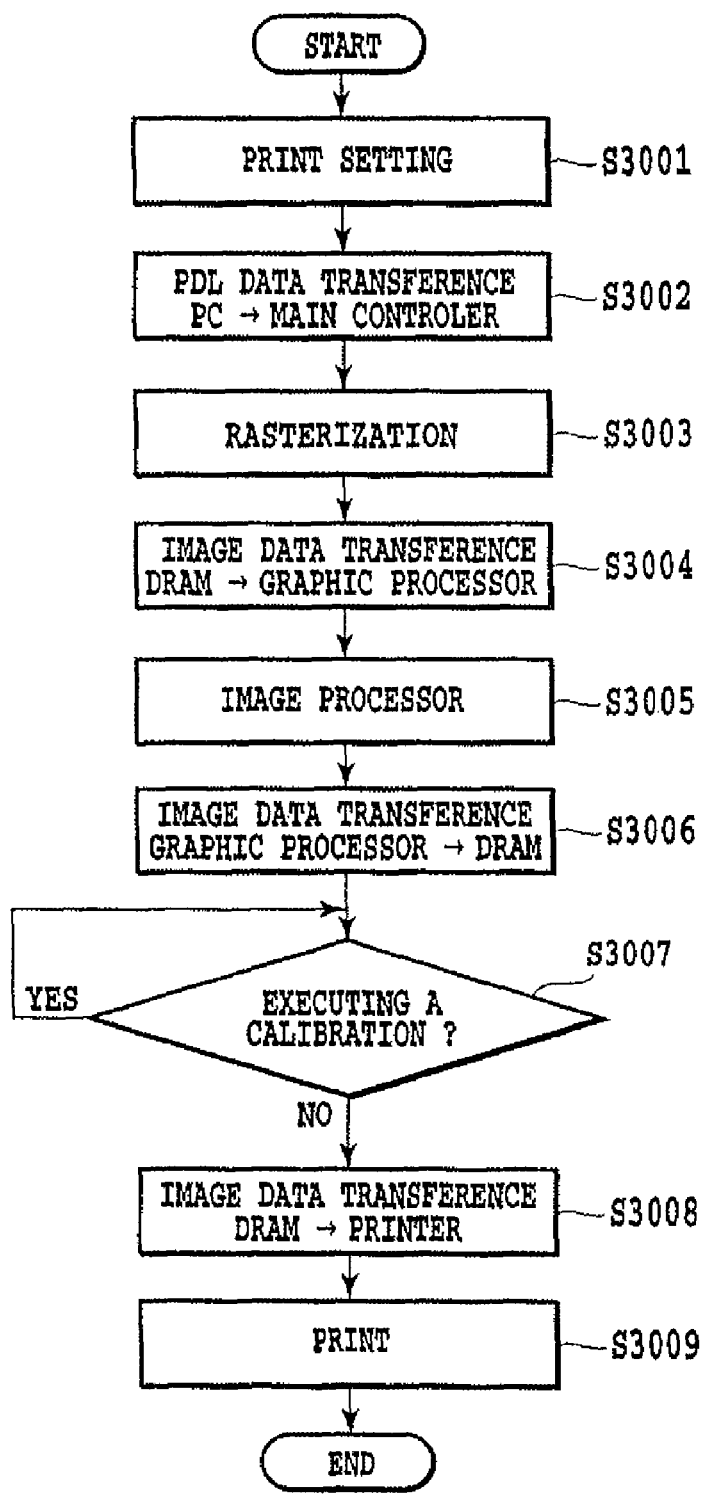
FIG. 13 is a flowchart showing a typical PDL image output procedure.

FIG. 13 is a flowchart showing a typical PDL image output procedure. When a PDL image output is to be produced, in step S3001, the user makes print settings for the corresponding PDL image output job through a printer driver user interface on the host computer 401. The print settings include the number of copy sets or stacks to be produced, a paper size, one-sided/two-sided, an output page order, sort output, stapling, and the like.

In step S3002, a print command is issued on the host computer 401 and driver software installed in the host computer 401 converts coded data to be subjected to printing on the host computer 401 to what is called PDL data. The converted PDL data, together with print setting parameters set in step S3001, is transferred to the controller 110 over the network 400.

In step S3003, the CPU 112 of the main controller 111 of the controller 110 rasterizes the PDL data transferred through the connector 122 and the network controller 121 to image data based on the print setting parameters described in the foregoing. Rasterization of the image data is carried out on the DRAM 116. When the rasterization of the image data is completed, the operation proceeds to step S3004.

In step S3004, the main controller 111 transfers the image data converted on the DRAM 116 to the graphic processor 135.

In step S3005, the graphic processor 135 forms an image independently of the print setting parameters described in the foregoing. If, for example, the paper take-up unit 360 of the printer portion 300 is loaded with A4R paper only, despite the setting of the paper size made to A4 as defined with the print setting parameters, an image output that coincides with the output paper can be produced by rotating the image through 90 degrees using the graphic processor 135. When image formation of the image data is completed, the operation proceeds to step S3006.

In step S3006, the graphic processor 135 transfers the image data after image formation to the main controller 111. The main controller 111 then stores the image data transferred from the graphic processor 135 on the DRAM 116.

In step S3007, it is determined whether or not the main controller 111 is executing a calibration procedure. If it is determined that the main controller 111 is executing a calibration procedure, the PDL image output is put in a queue. If it is determined that the main controller 111 is not executing a calibration procedure, the operation proceeds to step S3008. The decision to be made to determine if a calibration procedure is being executed or not is made each time the image formation for PDL data representing one page is completed if there are involved a plurality of pages of the PDL data. A print cycle for the pages of images, for which image formation has been completed, can therefore be started as soon as the calibration procedure is completed, even if image formation for all pages involved of the PDL data is yet to be completed. This makes for a printing operation at a high speed. In this case, processing performed through the steps from step S3001 to step S3006 for printing pages, for which image formation has been completed, is executed in parallel with processing performed for the PDL data, for which image formation is yet to be completed.

In step S3008, the main controller 111 transfers the image data stored on the DRAM 116 to the printer portion 300 at an appropriate timing, while controlling the printer portion 300 through the printer I/F 145 and the connector 147.

In step S3009, the controller 110 controls the printer portion 300 to produce a printed page of the image data. When the transfer of the image data is completed, namely when the corresponding PDL job is completed, a production of a printed page is completed. Through the arrangement as described in the foregoing, since processing for PDL conversion and image formation is carried out and the formed image data is stored on the DRAM 116 even while a calibration procedure is being executed, the print cycle can be started as soon as the calibration procedure is completed, thus realizing a high-speed printing operation.

In the preferred embodiment of the present invention as described in the foregoing, the decision to determine if a calibration procedure is being executed or not is made during a sequence of PDL image output and subsequent processing is carried out based on the results of the decision made. It is nonetheless to be understood that the invention is not limited to only this embodiment. To be more specifically, the decision to determine if a calibration procedure is being executed or not may be made also during a sequence of fax-received image output and the subsequent processing may be carried based on the results of the decision made.

According to the preferred embodiment of the present invention as configured as described in the foregoing, even if a PDL print job is loaded by way of the network during the execution of a calibration procedure, it is possible to produce the PDL output without interfering with the execution of the calibration procedure.

Further, even if a fax-received image print job is loaded from the network during the execution of a calibration procedure, printing of the fax-received image can be made without affecting the execution of the calibration procedure.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

What is claimed is:

1. An image forming apparatus, comprising:
   a printing unit, constructed to print a pattern image including a plurality of patches; and
   a calibration unit, constructed to compare a value obtained by reading said pattern image with a reference value to create a calibration table,
   wherein an input process for a printing a job from a network and a rasterization process for the input printing job are executed while the calibration unit is executing a calibration process, and an output process for the rasterization processed image is started after the calibration process is completed.

2. An image forming apparatus according to claim 1, wherein said printing job is input from a host computer with PDL data.

3. An image forming apparatus according to claim 1, wherein an image data rasterized by the rasterization process is stored in a DRAM.

4. An image forming apparatus according to claim 1, wherein said calibration table is created for each color of CMYK.

5. An image forming apparatus according to claim 1, wherein said pattern image has a plurality of gradations.

6. The image forming apparatus according to claim 1, wherein said output process is started after the calibration process is completed, even if the rasterization process for all data for the printing job is not completed.

7. An image forming method comprising:

printing a pattern image including a plurality of patches; and comparing a value obtained by reading said pattern image with a reference value to create a calibration table, wherein an input process for a printing job from a network and a rasterization process for the input printing job are executed during execution of a calibration process, and an output process for the rasterization processed image is started after the calibration process is completed.

8. An image forming method according to claim 7, wherein said printing job is input from a host computer with PDL data.

9. An image forming method according to claim 7, wherein an image data rasterized by the rasterization process is stored in a DRAM.

10. An image forming method according to claim 7, wherein said calibration table is created for each color of CMYK.

11. An image forming method according to claim 7, wherein said pattern image has a plurality of gradations.

12. The image forming method according to claim 7, wherein said output process is started after the calibration process is completed, even if the rasterization process for all data for the printing job is not completed.

13. A non transitory computer readable medium including a program having instructions for executing an image forming method, the method comprising:

printing a pattern image including a plurality of patches; and comparing a value obtained by reading said pattern image with a reference value to create a calibration table, wherein an input process for a printing job from a network and a rasterization process for the input printing job are executed during execution of a calibration process, and an output process for the rasterization processed image is started after the calibration process is completed.

14. The computer readable medium according to claim 13, wherein said output process is started after the calibration process is completed, even if the rasterization process for all data for the printing job is not completed.

* * * * *